AUDIO ACTUATED SWITCH FOR TRANSCEIVER TRANSMITTER

Filed Feb. 21, 1962

INVENTOR.
ARMAND JOSEPH FRANCHI
BY
Phillip A. Weiss
PATENT ATTORNEY

United States Patent Office 3,169,221
Patented Feb. 9, 1965

3,169,221
AUDIO ACTUATED SWITCH FOR TRANSCEIVER TRANSMITTER

Armand J. Franchi, Fort Wayne, Ind., assignor to International Telephone and Telegraph Corporation, New York, N.Y., a corporation of Maryland Filed Feb. 21, 1962, Ser. No. 174,752
6 Claims. (Cl. 325—15)

Figure 1:
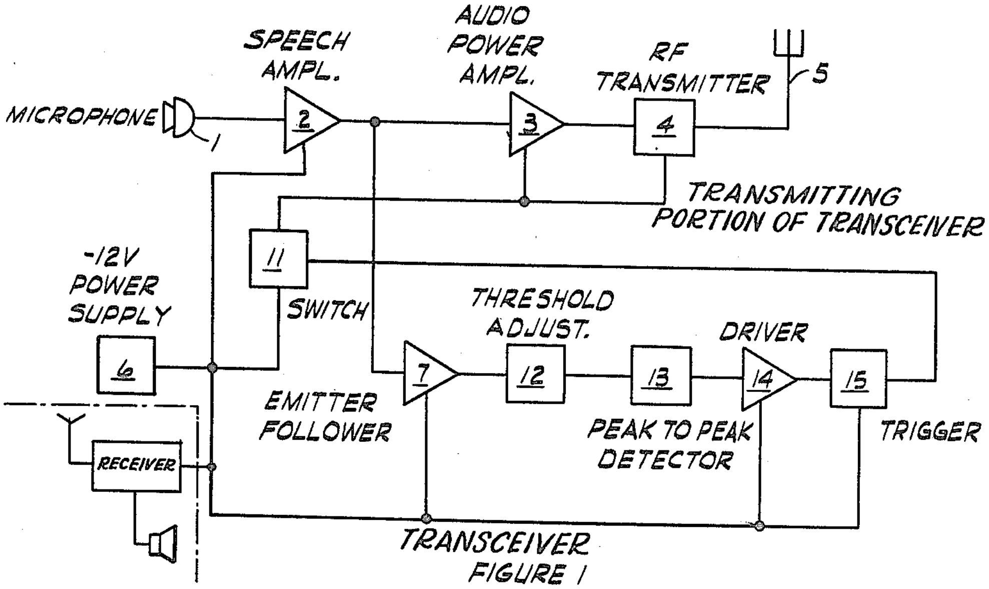

This invention relates to audio-operated systems and more particularly to audio actuated switches for use in transceivers and the like.

Transcievers have in the past used push-to-talk switches. This unduly restricted the use of such transcievers because the hands of the operators had to be constantly used to operate the push-to-talk switches and hence could not be used for other tasks. To obviate the use of push-to-talk switches, audio gating circuitry comprising voice operated relays were used. Among the disadvantages of such audio gating circuits are the relatively large size and slow response speed of such devices. The response speed of even the best relays is too slow for the transmitter to transmit the first syllables spoken into the microphone. These problems have been reduced with the advent of semiconductor switches. However, even the semiconductor voice operated switches presently available clip the first syllable spoken into the microphone. In an attempt to overcome first syllable clipping, many of the devices have been made so sensitive and speeded up to such an extent that they operate on noise or cut off at pauses between sentences or even words.

Therefore, it is an object of this invention to provide new and improved voice operated switches.

A related object is to provide compact, miniaturized electronic voice operated switches.

A further object of this invention is to provide voice operated switches for transceivers that work fast enough to transmit even the first syllable.

Yet another object of this invention is to provide a vice operated switch which only operates responsive to an audio signal above predetermined threshold level and remains operated for a certain definite time after the end of the audio signal. This tends to prevent operation responsive to noise and keeps the switch operated during normal pauses between sentences.

In accordance with one aspect of this invention, a small personalized transceiver is provided for transmitting and receiving audio communications. To provide hands-free operation a unique electronic voice operated switch is utilized therein to connect the power supply to the transmitting portion of the transceiver when the microphone attached thereto is activated. A switch control unit provides a mark for operating the electronic switch, that is, when the signals detected by the microphone and associated speech amplifier have an amplitude and repetition rate larger than a certain predetermined value, a mark causes the switch to operate. The rate and amplitude requirement prevents ordinary noises from operating the transmitting equipment.

The control circuitry provides the mark and the switch is operated responsive to the syllabic rate of the input signal. The operation is fast enough to obviate any clipping of the first syllable of transmitted signal. The control circuitry also delays the end of the mark to prevent the switch from turning off responsive to the syllabic rate; thereby, allowing for the normal pauses between words, clauses and sentences.

Figure 2:
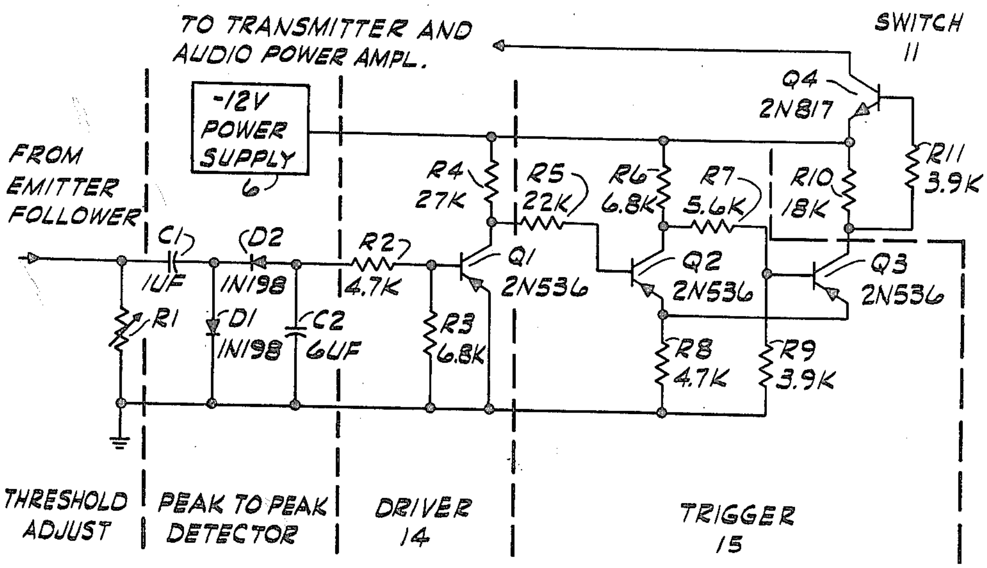

The above-mentioned and other features and objects of this invention and the manner of obtaining them will become more apparent and the invention itself will be best understood by reference to the following description of an embodiment of the invention taken in conjunction with the accompanying drawings, wherein:

FIG. 1 shows in block diagram form the transmitting portion of a transceiver including audio gating circuitry; and FIG. 2 shows in schematic form a preferred embodiment of the audio gating circuitry.

In FIG. 1 the block diagram of the transmitting portion of a transceiver includes a Microphone 1 for translating oral audio signals into equivalent electrical signals. Microphone 1 is connected to means for amplifying its output signals such as Speech Amplifier 2. The output of the speech amplifier is connected to a power amplifier wherein the audio signal power is amplified sufficiently to make it possible to drive the modulating devices of a transmitter. Such an amplifier is shown in FIG. 1 as Audio Power Amplifier 3. The output of Audio Power Amplifier 3 is connected to a means for using the audio signal to modulate a carrier and to transmit this modulated carrier to a means for radiating the modulated carrier wave. The modulating and transmitting means is shown as RF Transmitter 4 and the radiating means is shown as Antenna 5.

Means such as Power Supply 6 is provided for supplying operating power to the components in the circuitry of the transceiver.

The output of Speech Amplifier 2 is also connected to audio gating circuitry through an impedance matching means such as Emitter Follower 7 used to prevent undue loading of the transmitter circuitry.

All of the portions of the transceiver disclosed to this point may be any devices well known to those skilled in the art and readily available on the market.

The Power Supply 6 is connected to Audio Amplifier 3 and RF Transmitter 4 only when Microphone 1 is actuated. This is done by connecting the power supply to those circuits through a voice operated switch means such as Switch 11. Switch 11 is normally open so that transmission cannot occur. When the Microphone 1 is actuated by a party talking into it, switch 11 is operated to connect the power supply to Power Amplifier 3 and Transmitter 4 causing these devices to operate.

Means are provided for controlling the switch operation. The control means provides a mark which operates the switch to its "closed" position connecting the power supply to the transmitting equipment. The control means operates responsive to signals from Emitter Follower 7 that are of a predetermined peak-to-peak amplitude and repetition rate within the voice frequency range.

More specifically means such as Threshold Adjust 12 is provided for setting the audio gain of the control circuitry and thereby the voltage amplitude to which the control means will respond. Threshold Adjust 12 derives its input from Emitter Follower 7.

Means such as Detector 13 is provided for responding to the peak-to-peak values of the audio input signal. Detector 13 provides at its output a voltage equivalent to the peak-to-peak value of the input signal voltage if the input signals are within the audio frequency rate. If the frequency of this signal is higher or lower than the normal audio frequency range, then the detector will not provide a sufficient peak-to-peak voltage at its output. Means within Detector 13 are provided for maintaining the output voltage for a predetermined time length after the termination of an input signal.

Means such as Driver 14 is used to translate the detector voltage to a trigger drive signal. That is, responsive to a detector voltage output of sufficient amplitude Driver 14 operates to actuate mark producing equipment.

Means such as Trigger 15 are provided for producing a mark which is used to operate Switch 11. Trigger 15 has a fast response time and produces a steady output voltage sufficient to keep the switch operated as long as Driver 14 operates.

The operation of Switch 11 and its associated control circuitry will now be explained in greater detail by making reference to FIG. 2 which shows a preferred embodiment of a voice operated switch and associated control circuitry in schematic form. Dashed lines are used to correlate the blocks of FIG. 1 to portions of the schematic.

Receipt of an audio signal through the Speech Amplifier 2 and Emitter Follower 7 causes a signal to appear at Threshold Adjust Means 12 which in this preferred embodiment is Adjustable Resistor R1. Varying the resistor which is at the input to a driver, changes the gain of the driver since as the resistance gets smaller the input signal is attenuated further. Thus the larger the resistance value of Resistor R1 the more sensitive is the driver and hence the smaller the input signal necessary to operate the driver.

The Detector 13 comprises Capacitor C1 which is charged to the peak value of the positive first cycle of the incoming audio signal through Diode D1. On the negative half cycle this voltage is applied in series with the negative signal peak through Diode D2 to charge Capacitor C2 to the peak-to-peak voltage of the incoming wave form. Caapcitor C2 charges up almost immediately since the resistance of Diode D2 is negligible with regard to the negative signal. On the next positive half of the cycle, Capacitor C2 discharges slowly through the series combination of R2 and R3. The time rate of discharge is of course governed by the values of Capacitor C2 and Resistors R2 and R3. In a preferred embodiment the values of the components were selected to give a time constant of approximately three-tenths of a second. The length of time that Switch 11 remains operated after voice signal inputs cease is governed by this time constant.

The driver is shown in FIG. 2 as P-N-P Transistor Q1, a D.C. amplifier biased to operate at or near current cutoff when no signal is present. The normal cutoff bias is provided by Resistor R4 connected between the −12V Power Supply 6 and the collector of the transistor while the base is connected to ground through R3 and the emitter is connected directly to ground. When Capacitor C2 is charged to the negative D.C. voltage the base collector of the transistor is forward biased and Transistor Q1 conducts. When Transistor Q1 conducts it acts as a forward bias network to apply a current bias through Resistor R5 connected in series with the base of P-N-P Transistor Q2.

The aforementioned Transistor Q2 is part of the Trigger Circuit 15 which is shown in FIG. 2 made up of Transistors Q2 and Q3 and associated circuitry. Normally, Q2 is biased to conduct through Resistors R5 and R4 connected in series with Power Supply 6 and the base of the transistor. The base of Q2 is in this way biased negatively with respect to its emitter. Therefore current flows from ground through Resistor R9, through the emitter of Transistor Q2 to its collector, through Resistor R6 to Power Supply 6. When Transistor Q1 conducts, the base of Q2 becomes positive with respect to its emitter and current ceases to flow through Transistor Q2. This biases P-N-P Transistor Q3 to conduct. In greater detail, the current path through Transistor Q3 goes from ground through Resistor R8, the emitter and the collector of Transistor Q3, through Resistor R10 to Power Supply 6. It should be noted that when Transistor Q2 is conducting, no current flows through Transistor Q3 since the current through Transistor Q2 causes a voltage drop in Resistor R6 that is large enough to bias the base of Transistor Q3 to cutoff. The base of Transistor Q3 is connected to the junction of Resistors R7 and R9 biased through the voltage divider resistance chain made up of Resistors R6, R7 and R9 which extend from ground to Power Supply 6.

When Transistor Q3 is in its non-conducting condition, Switch 11 which is shown in FIG. 2 as N-P-N Transistor Q4 is biased to cutoff. More specifically, the bias circuit goes from the base of Transistor Q4 through Resistors R11 and R10 to Power Supply 6. This cuts off Transistor Q4 since it puts the base of Transistor Q4 at substantially the same potential as its emitter. When Transistor Q3 conducts, the base of Transistor Q4 becomes positive with respect to its emitter causing current to flow through it. In greater detail, current through Q3 causes a voltage drop across Resistance R10. Since the emitter of Transistor Q4 is connected directly to Power Supply 6, this voltage drop across Resistor R10 causes the base of Transistor Q4 to be positive with respect to its emitter. Current flows from Power Supply 6 through Transistor Q4 to Audio Amplifier 3 and RF Transmitter 4, allowing the transmitting portion of the transceiver to operate.

The characteristics of the trigger circuit described above are such that there is a definite and sharp transition of the "on" and "off" states of the trigger. Also the value of the voltage required to turn the trigger "on" is higher than the value of the voltage at which the trigger turns "off." Current switch Transistor Q4 is maintained "on" until Capacitor C2 has discharged sufficiently to allow Transistor Q1 to return to its non-conducting state. Transistors used in this circuitry can be any type of miniaturized fast switching transistors well known to those skilled in the art, however in a preferred embodiment Q1, Q2 and Q3 are Type 2N536 and Transistor Q4 is Type 2N817.

The advantages obtained in using a fast voice operated switch on a transceiver are that hands-free operation can be attained. The particular type of voice operated switch described herein is sufficiently fast to allow transmission of even the first syllable of the message. This speed is attained without increasing the sensitivity of the voice operated switch to the point where it is operated by extraneous noises.

While the principles of the invention have been described in connection with specific apparatus, it is to be clearly understood that this description is made only by way of an example and not as a limitation on the scope of the invention.

I claim:

1. A transceiver comprising means for transmitting and receiving audio signals, said transmitting means comprising means responsive to said audio signal for modulating a carrier signal and transmitting said modulated signal power, means for supplying power to said transmitting means, switch control means comprising peak to peak detector means for providing a voltage responsive to the syllabic rate of said audio signal, driver means for amplifying said voltage, transistorized trigger means connected to said driver for providing a switch operating signal responsive to said amplifying voltage, and siwtching means operated responsive to said switch operating signal for connecting said power means to said transmitting means to supply operating power thereto, thereby causing transmission of said modulated signal.

2. The transceiver of claim 1 and means for adjusting the gain of said driver means.

3. The transceiver of claim 2 and means for maintaining said switch operating signal for a predetermined period of time.

4. The transceiver of claim 3 wherein said trigger means comprises a bistable two-transistor square wave generator wherein said transistors have a common emitter resistor.

5. The transceiver of claim 4 wherein said switch means comprises a transistor normally biased to cutoff.

6. An audio actuated switch for connecting the transmitter of a transceiver to a power supply responsive to audio signals comprising microphone means for converting said audio signals to oscillating electrical signals having peak-to-peak variations, detector means for producing a signal responsive to said peak-to-peak variations, transistorized Schmitt trigger means operated responsive to said last named signal reaching a predetermined level for providing a switch control signal, and semi-conductor means connected between said power supply and said transmitter operated to a conducting state responsive to said switch control signal to connect said power supply to said transmitter.

References Cited in the file of this patent

UNITED STATES PATENTS

| | | |
|---|---|---|
| 1,958,994 | Green | May 15, 1934 |
| 2,206,682 | Wassell | July 2, 1940 |
| 2,287,862 | Brian | June 30, 1942 |
| 2,496,186 | Walter | Jan. 31, 1950 |
| 2,696,529 | Bachelet et al. | Dec. 7, 1954 |
| 2,926,241 | Goldman | Feb. 23, 1960 |
| 3,012,138 | Myers et al. | Dec. 5, 1961 |
| 3,079,558 | Spencer | Feb. 26, 1963 |
| 3,102,236 | Eichenberger et al. | Aug. 27, 1963 |

FOREIGN PATENTS

| | | |
|---|---|---|
| 252,027 | Great Britain | Feb. 3, 1927 |